(12) United States Patent
Pinard

(10) Patent No.: US 6,836,893 B2
(45) Date of Patent: Dec. 28, 2004

(54) DATA DRIVEN COMMUNICATION SYSTEM

(75) Inventor: Deborah L. Pinard, Kanata (CA)

(73) Assignee: Pika Technologies Inc., Kanata (CA)

( * ) Notice: Subject to any disclaimer, the term of this patent is extended or adjusted under 35 U.S.C. 154(b) by 525 days.

(21) Appl. No.: 09/823,991

(22) Filed: Apr. 3, 2001

(65) Prior Publication Data

US 2002/0144013 A1 Oct. 3, 2002

(51) Int. Cl.[7] ............................................. G06F 13/00
(52) U.S. Cl. ..................... 719/317; 709/202; 379/29.09; 379/221.01; 379/265.11
(58) Field of Search ................................. 709/316, 202; 719/317, 202

(56) References Cited

U.S. PATENT DOCUMENTS

| | | | | |
|---|---|---|---|---|
| 5,611,050 A | * | 3/1997 | Theimer et al. ............ | 709/202 |
| 5,638,494 A | | 6/1997 | Pinard et al. | |
| 5,944,783 A | | 8/1999 | Nieten | |
| 5,946,464 A | * | 8/1999 | Kito et al. ................. | 7709/202 |
| 6,002,760 A | * | 12/1999 | Gisby ..................... | 379/266.01 |
| 6,151,309 A | | 11/2000 | Busuioc et al. | |
| 6,163,794 A | * | 12/2000 | Lange et al. ................ | 709/202 |
| 6,381,640 B1 | * | 4/2002 | Beck et al. ................. | 709/223 |
| 6,400,687 B1 | * | 6/2002 | Davison et al. ............. | 370/236 |

* cited by examiner

Primary Examiner—Meng-Al T. An
Assistant Examiner—Phuong N. Hoang
(74) Attorney, Agent, or Firm—L. Anne Kinsman; Borden, Ladner, Gervais LLP

(57) ABSTRACT

A data driven communication system has three layers consisting of destination, people or network nodes, and devices. Software agents represent the entities of these layers and relationships between agents are defined by policies or chains of policies. These relationships are used to determine communication paths within the system as well as features associated with a particular communication. A database representation of the objects (agents and policies) is used to configure the system and receive updates to the system by an administrator. A graphical user interface can be used to enter data into the database and facilitates an intuitive understanding of the nature of the relationships involved.

27 Claims, 23 Drawing Sheets

Types of Policy in PolicyID:

- Time of Day Policy
- Day of Week Policy
- Date Policy
- Calling Line ID Policy
- Group Policy
- Node Policy
- Device Policy

Figure 6A

Policies In Policies

Selection Policy in Group Policy:
- terminal
- circular
- broadcast
- longestidle Destination Policy in Node Policy
- based on which destination was used to reach this node can choose a different policy path

Figure 6B

| Type 1 Features | Type 2 Features | Type 3 Features |
|---|---|---|
| • Hold<br>• Transfer<br>• Hot Line<br>• Call Forward<br>• Conference<br>• Swap<br>• Camp On<br>• Queue<br>• Call Park | • Turn on/off Do Not Disturb<br>• Turn on/off Forwarding<br>• Change Forwarding Destination<br>• Program Speed Calls | • Auto Attendant<br>• Voice Mail<br>• In Queue IVR<br>• Log In |

Figure 20A     Figure 20B     Figure 20C

DATA DRIVEN COMMUNICATION SYSTEM

FIELD OF THE INVENTION

The present invention relates generally to a communication system. More particularly, the present invention relates to a communication system that uses agents to enhance flexibility of the system.

BACKGROUND OF THE INVENTION

Most existing communication systems grew out of the public-switched telephone system, which was created as a point-to-point voice system. Based on the initial concepts and the technologies of the time, telephones and telephone numbers were identified with specific people or locations. In other words, traditionally a person is identified with a specific telephone in a person's home or office and that telephone is identified by a specific telephone number. That traditional mindset continues in the present day even though a person may have the use of multiple communications devices including landline telephones, cellular telephones and voicemail boxes. Accordingly, it is desirable to have a system that has increased flexibility and allows a person to receive a call using a desired device based, for example, on time of the day.

As technology advances, users are offered an increasingly varied number of features having greater complexity and sophistication. In conventional communication systems, such as telephone systems employing public branch exchanges (PBX) and central offices (CO), features are implemented in a call control system that uses a central resource manager. However, a serious drawback to this approach is that the call control system and the resource manager are very complex since they interact with or handle many aspects of the system, making modifications difficult to implement. In addition, modifications require highly specialized knowledge of the call control system and resource manager.

The difficulty of making such modifications results in an ineffective centralized system of requests for modifications or design changes. Typically, design change requests (DCR) received are centrally evaluated. Those requests believed to be of sufficiently high merit are planned to be implemented in a future release. This process typically involves many people or organizations and requires several months. In addition, a planned modification may not appear in the scheduled release if a subsequent DCR is given a higher priority.

Adding to the difficulty of the process is the highly specialized knowledge required. An experienced person who leaves an organization that maintains such centralized systems may be very difficult to replace and may affect the schedule of future releases or the number of modifications that can be made.

It is, therefore, desirable to provide a communication method and system that is flexible and eliminates the excessive complexity and difficulty in effecting system modifications.

SUMMARY OF THE INVENTION

It is an object of the present invention to obviate or mitigate at least one disadvantage of conventional communication systems. Generally, the present invention provides a data driven communication system that has three layers consisting of destination, people or network nodes, and devices. Software agents represent the entities of these layers and relationships between agents are defined by policies or chains of policies. These relationships are used to determine communication paths within the system as well as features associated with a particular communication. A database representation of the objects (agents and policies) is used to configure the system and receive updates to the system by an administrator. A graphical user interface can be used to enter data into the database and facilitates an intuitive understanding of the nature of the relationships involved.

In a first aspect, the present invention provides a method for establishing a communication path in a data-driven communication system. The method consists of defining a first relationship between a first layer agent and a second layer agent, and defining a second relationship between the second layer agent and a third layer agent. Next, a first communication link, between the first layer agent and the second layer agent, is established according to rules of the first relationship. A second communication link is then established, between the second layer agent and the third layer agent, according to rules of the second relationship. The first and second communication links establish a communication path.

In a presently preferred embodiment, the first layer agent is a destination agent, the second layer agent is a node agent, and the third layer agent is a device agent. The first and second relationship are defined by associating at least one policy, policy chain or branched policy chain with each of the relationships to define its rules. The communication path is established by providing system parameters, such as system time and system date, to the policies.

In a further aspect of the present invention, there is provided a data-driven communication system. The communication system includes a first layer agent, a second layer agent and a third layer agent. A first relationship, between the first layer agent and the second layer agent, is used to establish a communication link between them in response to data provided to the first layer agent. A second relationship, between the second layer agent and the third layer agent, is used to establish a second communication link between the second and third layer agents, in response to data provided by the second layer agent.

Again, in a presently preferred embodiment, the first layer agent is a device agent, the second layer agent is a node agent, and the third layer agent is a destination agent, and policies, policy chains or branched policy chains define the first and second relationships. System features can be provided for modifying the communication path. The system features can include in-call features, data modifying features, and advanced programmable system features.

It is presently preferred that the agents and policies be implemented as objects, through an acceptable object-oriented programming language. Typically, the objects are organized as records in tables in a database. Such a database permits the communication system to by configured at startup, or reconfigured as desired. A graphical user interface, displaying icons representing agents and policies, facilitates modification of the database.

Other aspects and features of the present invention will become apparent to those ordinarily skilled in the art upon review of the following description of specific embodiments of the invention in conjunction with the accompanying FIGS.

BRIEF DESCRIPTION OF THE DRAWINGS

Embodiments of the present invention will now be described, by way of example only, with reference to the attached figures, wherein:

FIGS. 6A and 6B illustrate examples of different types of policies;

FIGS. 20A to 20C illustrate examples of each type of feature;

DETAILED DESCRIPTION

Figure 1:
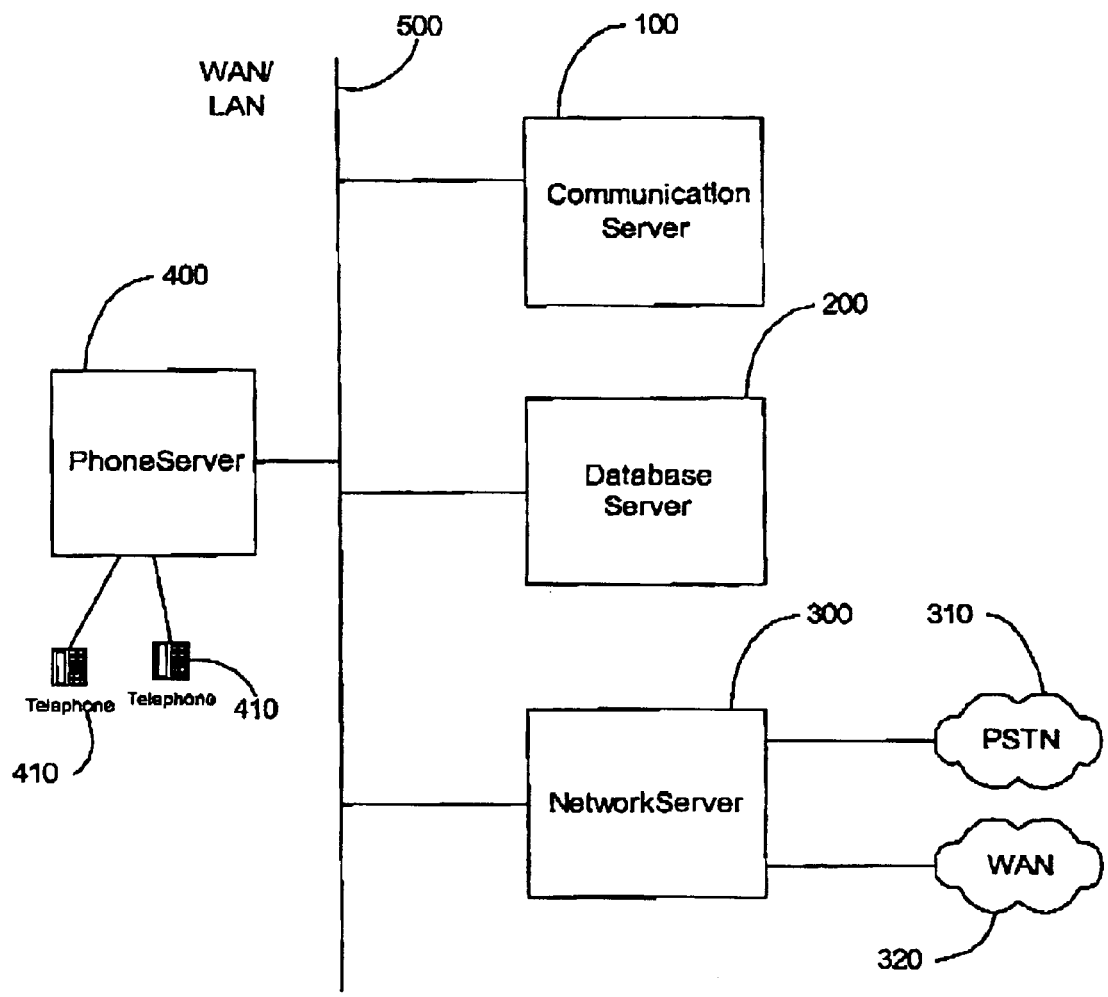
FIG. 1 illustrates schematically a conventional communication system.

A conventional communication system is illustrated in FIG. 1 and includes a communication server 100, a database server 200, a network server 300 and a phone server 400 interconnected by a local area network (LAN) or wide area network (WAN) 500. Telephones 410, and other analogous devices, are connected to the phone server 400. The network server 300 is typically connected to a public switched telephone network (PSTN) 310 and a WAN 320.

Generally, the present invention provides a method and system for data driven communication. In particular, the invention relates to the use of software entities and policies in the software architecture of communication server 100. Software constructs or entities are used to determine communication paths for communication calls. As exemplified by the embodiments of the invention discussed below, these entities can be organized into layers. By layers, we mean groupings of similar entities. Associated policies are used to determine the attributes or properties of relationships between the entities and communications following the communication paths. The system is "data driven" in the sense that data associated with a communication or call, such as the number being called, the time of day, the day of the week and the originator of the call can determine the communication path of the call and the associated attributes of the call.

The invention can be implemented in software using numerous approaches. The following example embodiment of the present invention uses an object oriented approach to system design and programming. As is known in the art of software development, under an object oriented approach, classes are established or defined and objects are instances of a particular class consisting of both data and procedures or methods to manipulate the data. According to the exemplary embodiment which embraces an object oriented approach, agents, policies, features and other software constructs are implemented as objects.

As used herein, "agent" refers to a software entity used to represent a corresponding real-world counterpart. Agents will be discussed in greater detail below. By "policy", we mean a software construct or object that is used to define relationships between agents. These relationships include rules for determining communication links and their properties. In particular, the relationship between two agents is defined by the policies associated with the communication link between the two agents.

Figure 2:
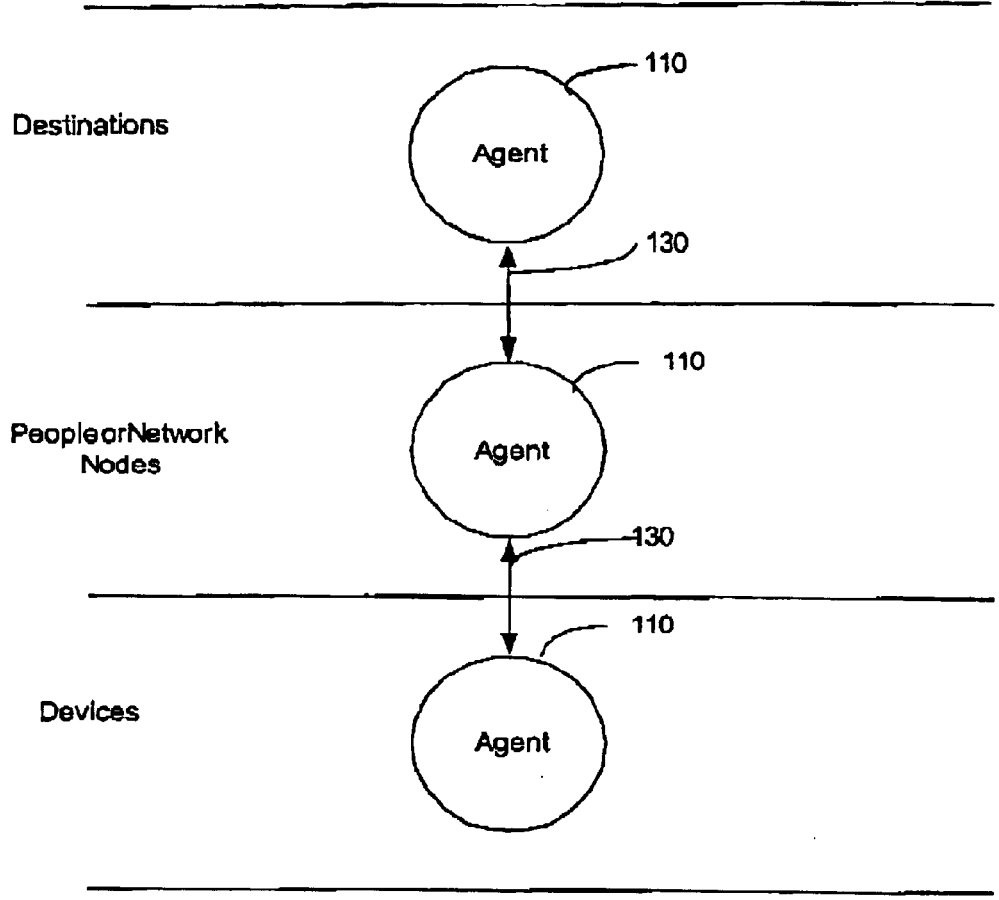
FIG. 2 illustrates the software architecture of a communication server according to an embodiment of the present invention.
Figure 17:
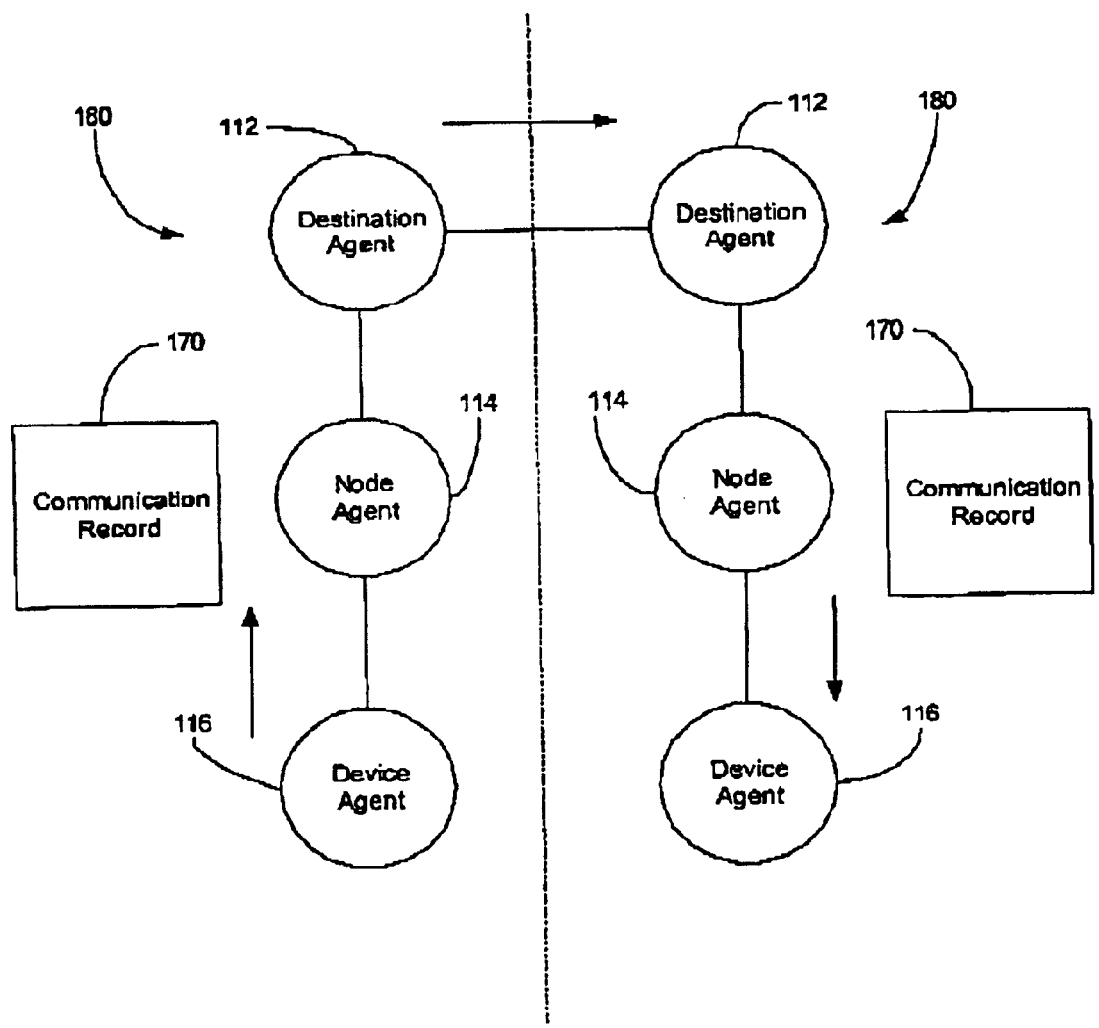
FIG. 17 illustrates schematically two half calls forming a call.

Referring to FIG. 2, the software architecture of an embodiment the present invention has three layers, namely, destinations, people or network nodes, and devices. Entities of each layer are represented by agents 110 linked by relationships 130. Specifically, as illustrated in FIG. 17, there are destination agents 112, person or node agents 114, and device agents 116. It should, however, be noted that the present invention is not restricted to three layers and that fewer or more layers are also possible in alternative systems. The three layer system described herein is especially applicable to a PBX replacement. However, a system can be designed to have two layers, or more than three, if desired. There can also be sub-layers within layers. Furthermore, entities are software constructs used by the system to establish communication paths. In the present example, it is convenient to associate entities with agents that correspond to real world counterparts. This is not, however, a necessary requirement of the architecture and the invention includes the possibility of other type of entities that may be entirely internal to the system.

Figure 3:
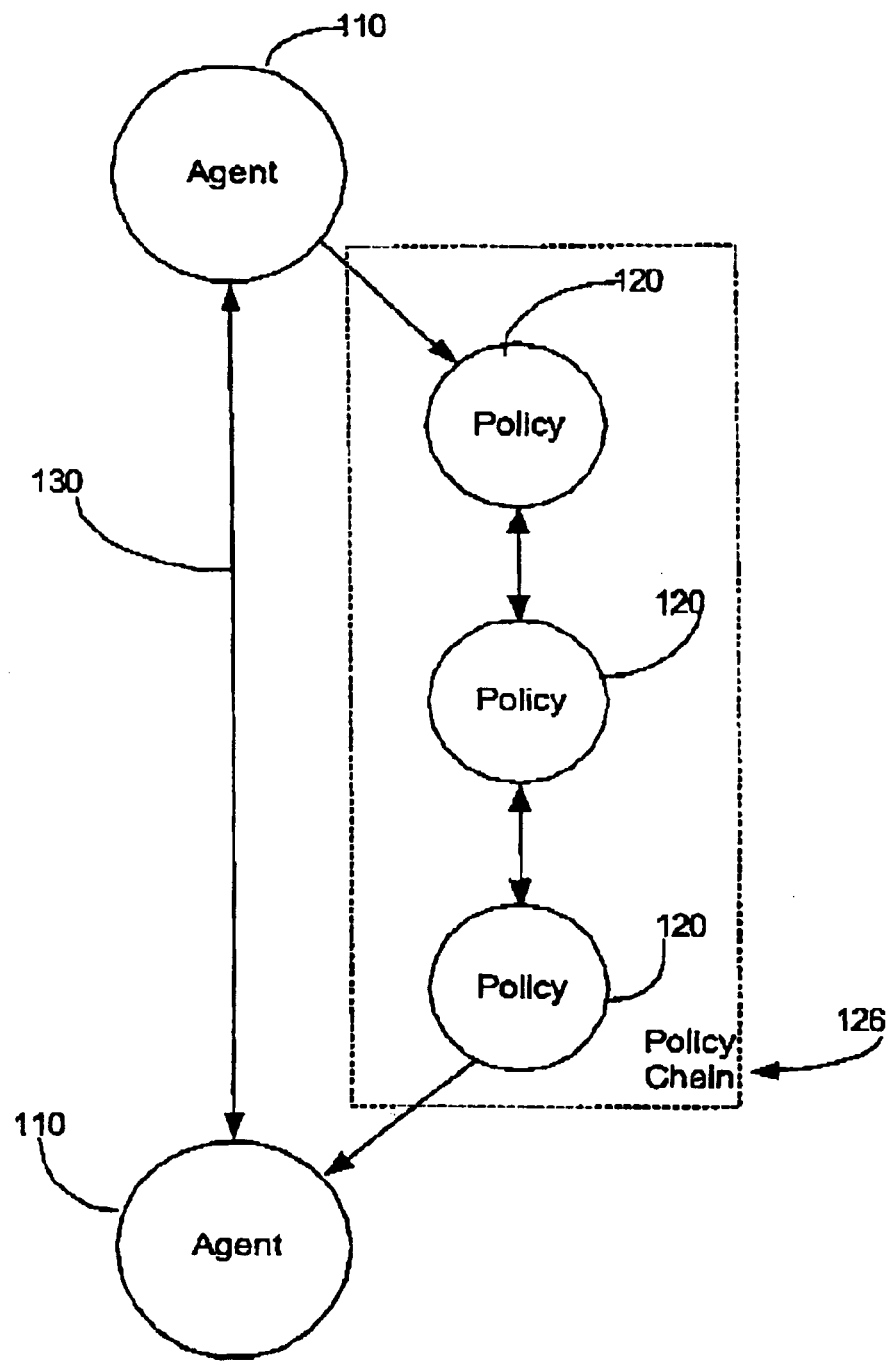
FIG. 3 illustrates the concept of a relationship between two agents.

Referring to FIG. 3, relationships 130 between agents 110 are defined by policies 120. A series of policies 120 forms a policy chain 126. In a communication, a communication path is established by the use of these agents. Specifically, a communication path from a first agent to a second agent consists of the communication link between the first and second agents. If there are one or more intermediate agents then the communication path consists of the links between the first link to the one or more intermediate agents, any links between the one or more intermediate agents and between the one or more intermediate agents to the second agent. The communication path established from the first agent to the second agent defines the attributes of the communication.

It is possible for two agents to be directly connected to each other. Indeed, this corresponds to the default case where "nothing special" happens. For example, a person node may be directly connected to a device if that person uses only one communications device, such as a landline office telephone with no voicemail, or other added features. In such a case, no additional processing logic is required and agents can be directly interconnected with no intervening policies. This direct connection is typical of conventional call control systems in which a phone number is tied to a device. Any changes to the system, for example to add increased functionality such as voicemail, conferencing, etc., require working around this inherent coupling between a phone number and a device, and patching or adding to the system in a piecemeal fashion.

By contrast, the architecture of a system according to the present invention does not assume that a phone number is always associated with a person, or that a person is always associated with a particular device. Of course, such a direct association can be easily implemented in the present invention.

The present invention facilitates the addition of enhanced functionality by the use of agents to represent destinations, nodes, and devices. Simply adding policies 120 to the policy chain 126 that defines the relationship 130 between agents 110 increases functionality. Changes in functionality can be simply effected by suitably modifying the corresponding policies 120. If the system is implemented using object-oriented programing, then changes to an object class can implement a consistent global set of changes.

In addition, a system according to the present invention is easy for developers and system administrators to understand. Once the basic architecture of the system is understood, a straightforward review of the relationships between agents will make it clear what functions and features are invoked in a communication session.

Figure 4:
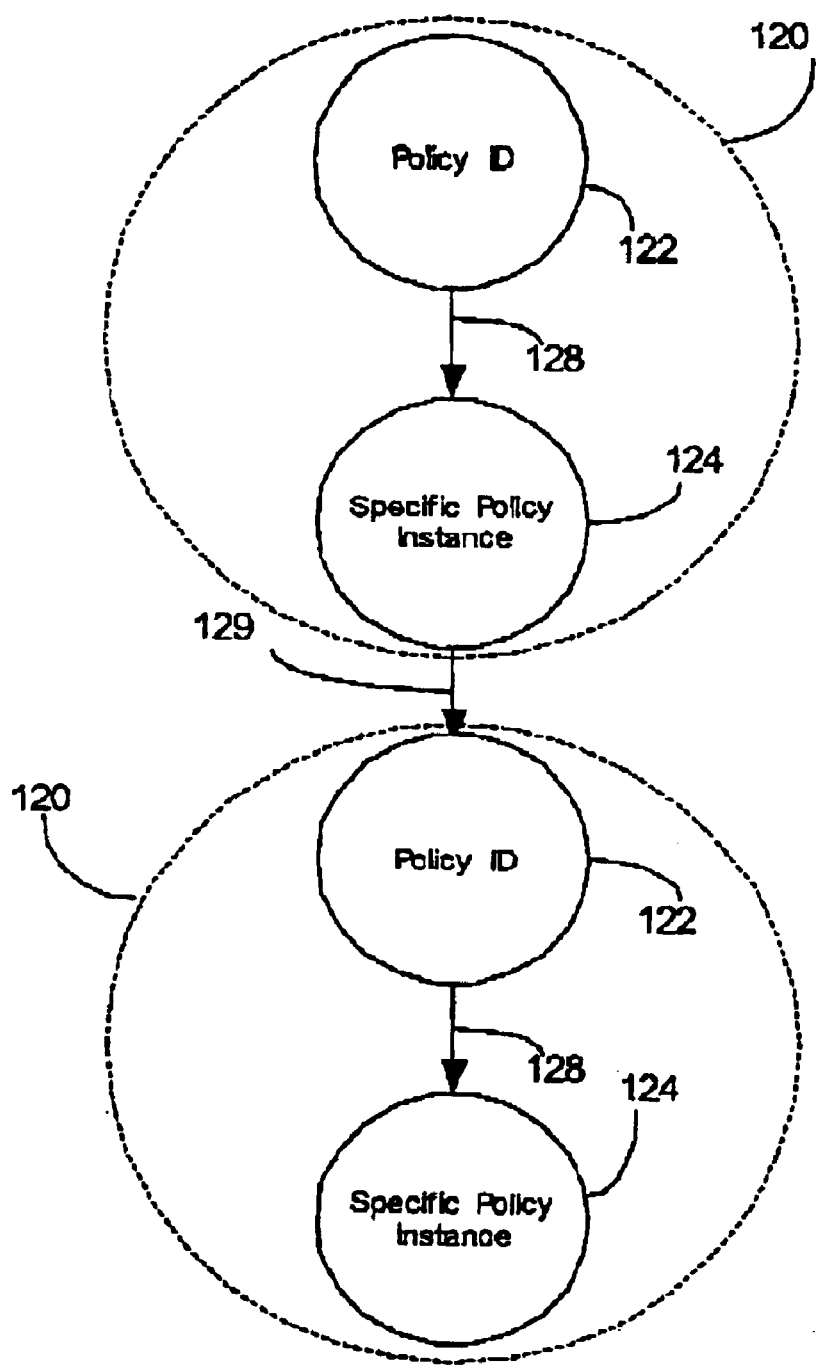
FIG. 4 illustrates the concept of a policy.

Each policy 120 consists of a policy identification (ID) 122 and a specific instance of a policy 124 as illustrated in FIG. 4. Policy ID 122 points to a specific policy 124 by employing a pointer 128. Each specific policy 124 can point to a further policy 120 in a policy chain through use of a pointer 129 pointing to the policy ID 122 of the further policy 120.

Figure 5:
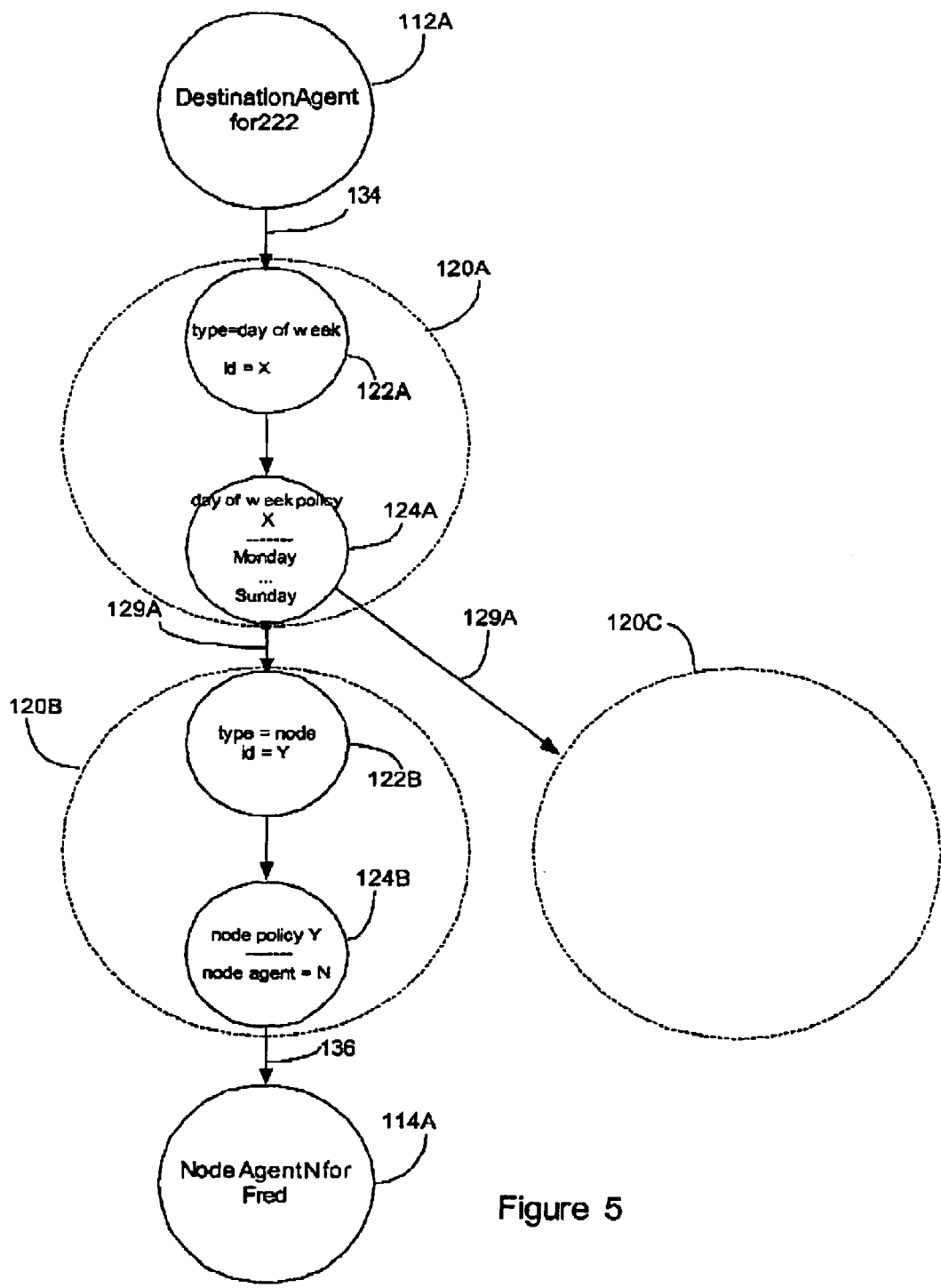
FIG. 5 illustrates an example of the relationship between two agents.

A specific example of policies 120 defining the relationship 130 between two agents 110 is illustrated in FIG. 5. In the example, "222" is a destination and could, for example, represent a telephone number of a person, Fred. A destination agent 112A representing destination "222" is linked to a node agent 114A representing Fred through a policy chain of policies 120A and 120B. Policy 120A consists of policy ID 122A, which has type equal to Day of Week and ID (i.e. the address of a specific Day of Week policy) equal to X. In other words, policy ID 122A points to specific Day of Week policy X 124A. As suggested by its policy type, specific policy X 124A points, via pointer 129A, to different objects depending on the day of the week. In the example, policy 120B corresponds with the day of the week of the call. However, if the call occurred on a different day of the week then another policy such as policy 120C could have been selected.

Policy 120B consists of policy ID 122B which identifies the policy type as "node" and the specific policy as node policy Y 124B. Specific policy Y 124B points to node agent 114A representing Fred. The meaning of the relationship between the destination agent 112A for destination "222" and the node agent 114A representing Fred is that if "222" is dialed on certain days of the week then the call will be connected to Fred. Of course, Fred is a person and cannot be contacted directly. Further agents will link the node agent 114A representing Fred to a suitable device. This will be illustrated in detail later.

FIGS. 6A and 6B illustrate different types of policies. FIG. 6A lists representative examples of policy types but many others could exist. A particular policy type included in FIG. 6A is the group policy. Group policies are useful for logically organizing individuals. For example, individuals who are designated to respond to user requests about technical matters could be the members of a help desk group.

Policies represent relationships between agents at different layers, but policies can also exist within policies. If we think of policies as rules for branching between agents of different layers then policies inside policies add refinements or sub-rules to the branching rules work.

In the example of FIG. 6B a policy inside a policy mechanism, i.e. a selection policy within the group policy, is used to select an individual from that group to respond to the call at hand. This would clearly be useful in distributing work to the members of our help desk group of our earlier example. Different selection policies use different strategies for passing on the call. A terminal selection policy starts at the head of the list and passes the call to the first available person implementing a hierarchy or priority system of distributing calls. A circular selection more evenly distributes calls than a terminal selection policy by beginning to hunt where the last hunt left off. A broadcast policy passes the communication to everyone at the same time, for example, when a voice mail massage is forwarded to everyone in the group. A longest idle selection policy begins by selecting the group member who has been idle the longest.

Another example of a policy inside a policy is a destination policy within a node policy. For instance, different telephone numbers could result in a communication path ending up at the same node but the different calls may continue along different paths out of the node. Accordingly, the node policy points to a different place, i.e. chooses a different policy path, depending on the desired destination. This provides another example of the flexibility inherent in the present system that is unavailable in conventional call control systems. To take a specific example, suppose that the manager of a help group has an assistant who receives calls to the manager to help screen Them. On a particular day, the help group is short staffed arid the manager agrees to take help desk calls, but still wants the assistant to screen regular calls. In a conventional system, the manager's number would be entered into the help desk group with the result that calls would first go through the assistant Of course, inline code could ho used to make an exception to the usual call processing but this is awkward and exemplary of a patch-work approach typical of conventional systems. By contrast, a system that uses the present invention can easily implement such an arrangement by noting that the destination of the call is the help desk and distinguishing this call from calls to the manager. Accordingly, calls to the help desk routed to the manager go directly to the manager's phone whereas calls to the manager go to the assistant. The case with which the system accommodates such changes is a direct consequence of the more powerful architecture of the system, using the layered agent approach.

A key aspect of the system is the use of a database to store information about the system. Entries within tables of the database represent objects, including agents and policies, within the system. The database is used to configure the communication server upon start up. Changes to the objects can be entered into the database, preferably using a graphical user interface. Additionally, any changes made directly to the system will also be recorded in the database so that no information is lost the next time the system starts up or is reconfigured.

Figure 7:
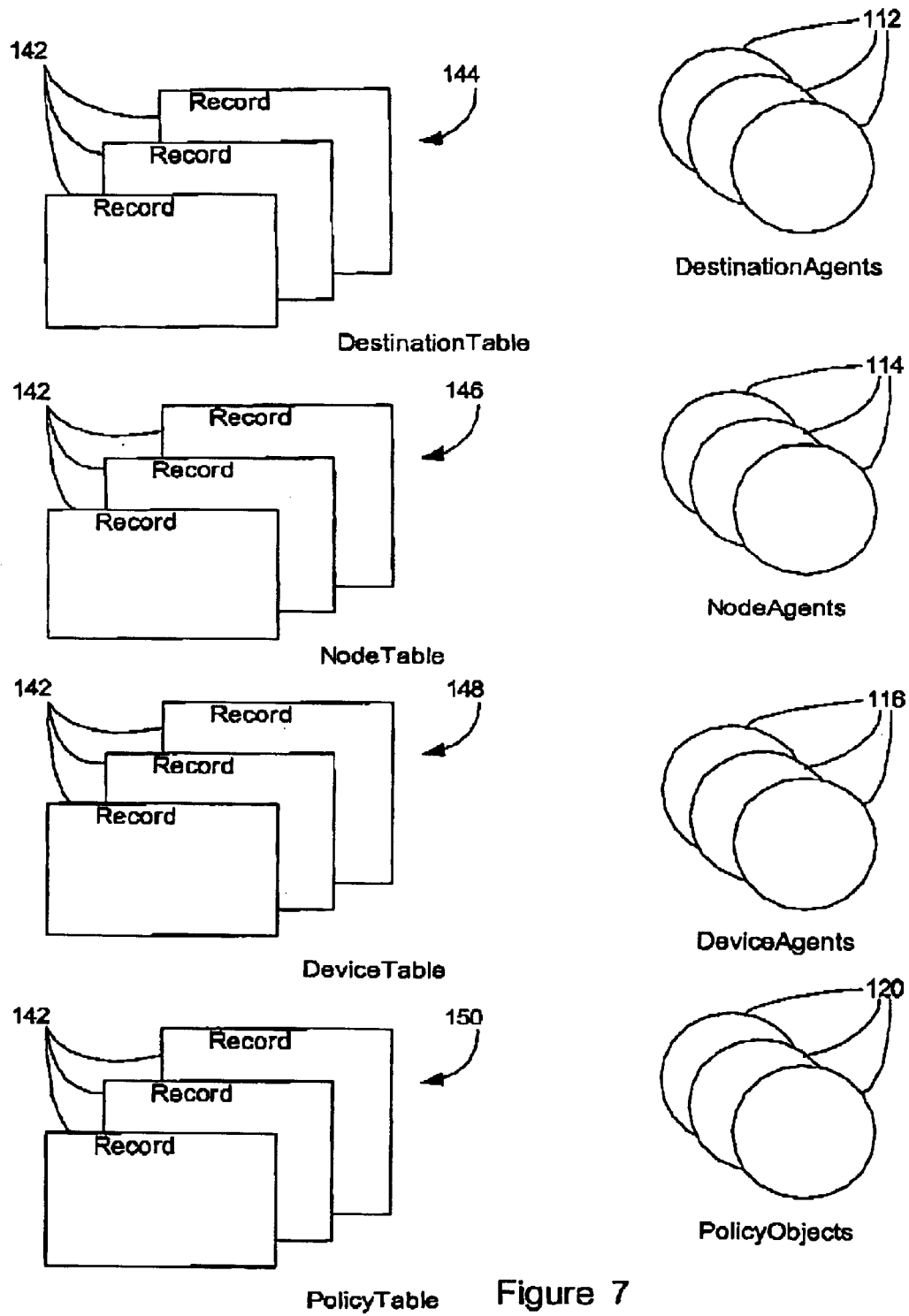
FIG. 7 illustrates the relationship between a database corresponding to the agents of the present invention.

FIG. 7 illustrates tables 144, 146 and 148 which correspond to the destination, the node layer, and the device layer, respectively. Generally, entries or records 142 in a table correspond to objects. Thus in FIG. 7, the records 142 of the destination table 144 correspond to destination agents 112, the records 142 of the node table 146 correspond to node agents 114 and the records 142 of the device table 148 correspond to device agents 116. Similarly, the records 142 of different policy tables 150 correspond to the policies 120 of the system.

Figure 8:
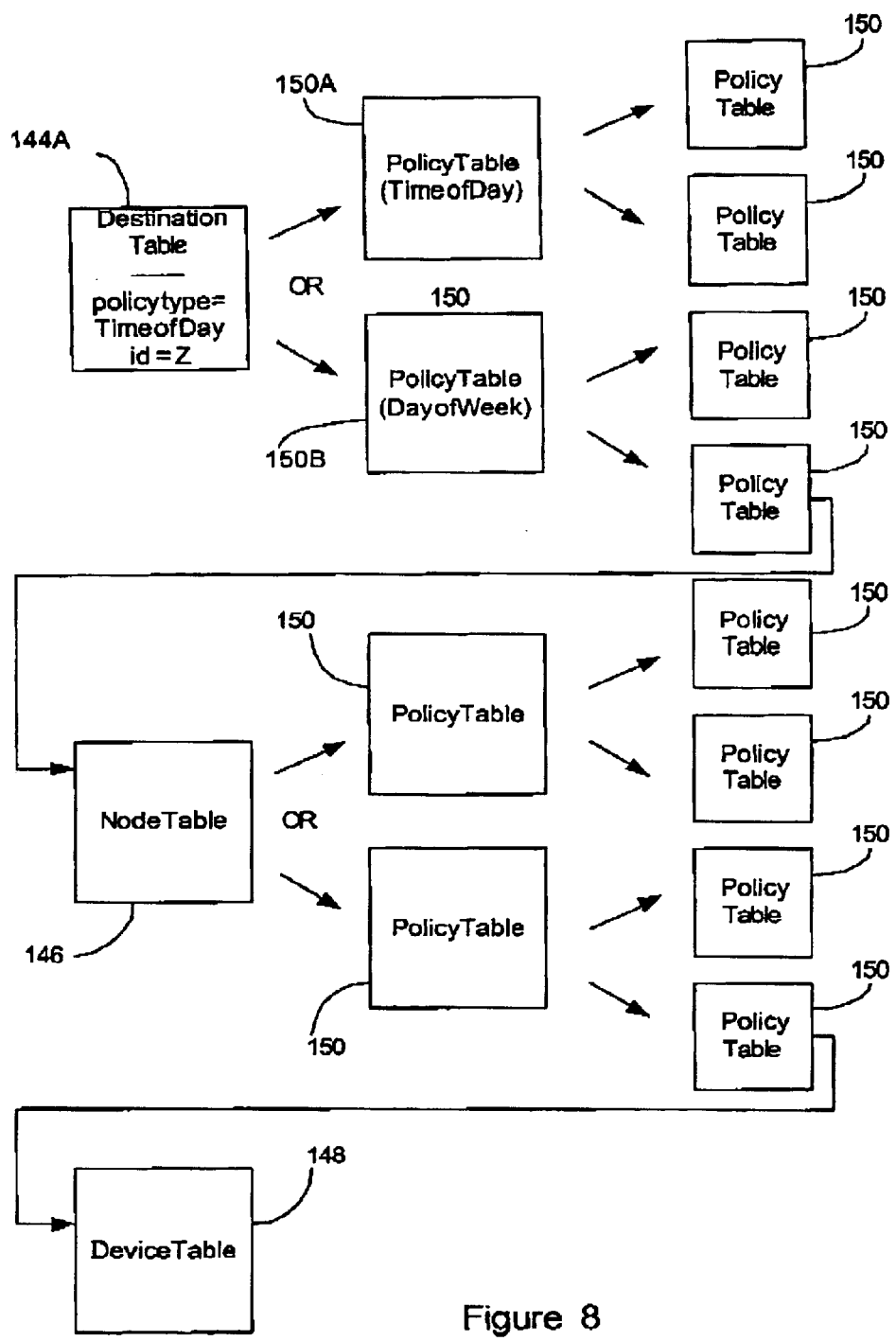
FIG. 8 illustrates the relationship between tables and objects (specifically, agents and policies)

In addition, the interrelationships between records in the database correspond to those between objects. This is shown in the example of FIG. 8 in which records in the destination table 144A point to records in a Time of Day policy table 150A or a Day of Week policy table 150B. This is directly analogous to the example of FIG. 5 in which destination agent 112A for destination "222" points to Day of Week policy 120A. Recall that Day of Week policy 120A consists of policy ID 122A and specific policy X 124A. Similarly, a record in destination table 144A specifies a policy type (indicating the type of table) and a policy ID (indicating which record in the table). From policy tables 150A, 150B, further policies 150 can be specified until a node table 146 is reached. Then additional policy tables 150 are accessed until a device table 148 is reached.

Figure 9:
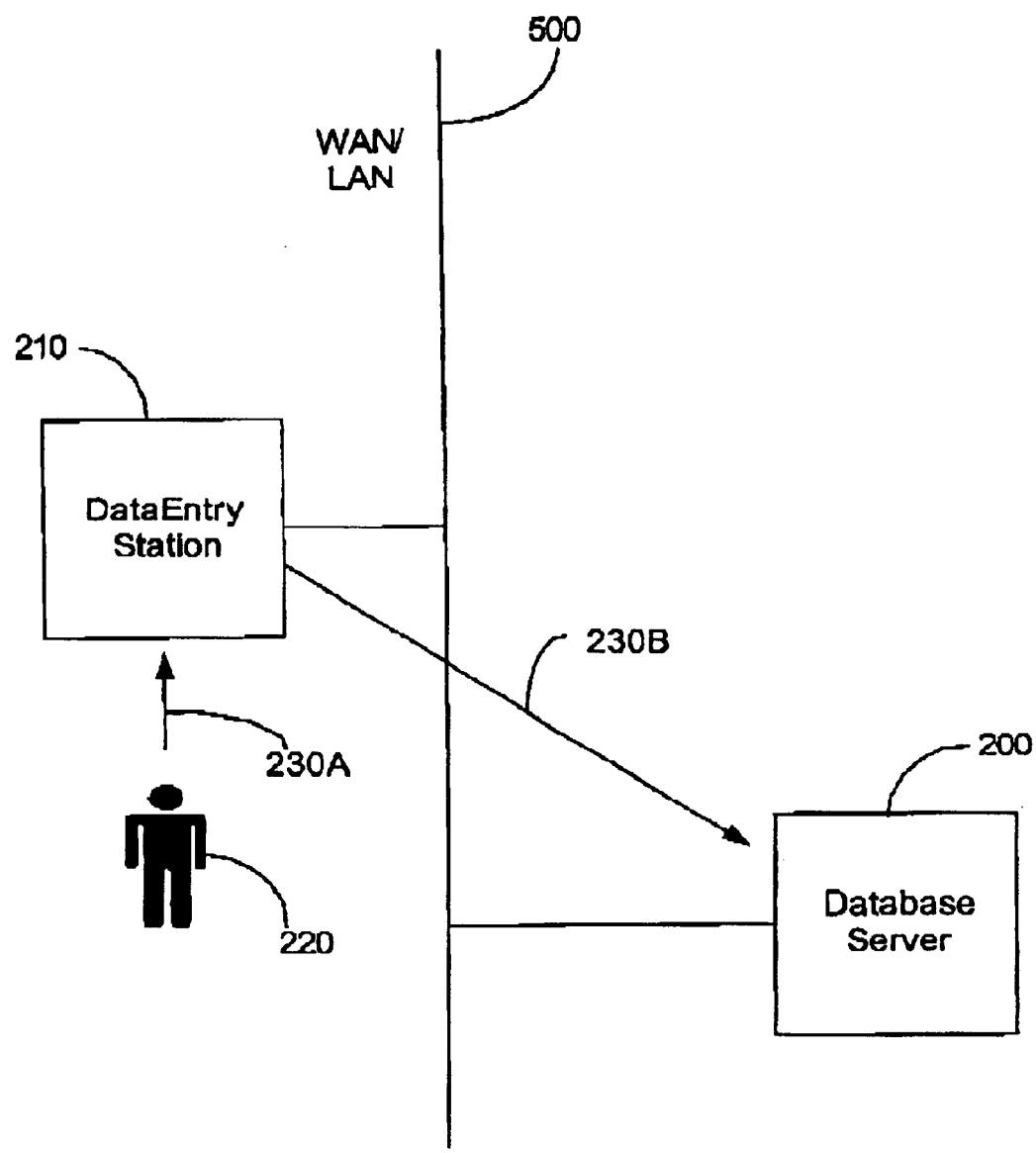
FIG. 9 illustrates the setup of the system by a user using a data entry station.
Figure 10:
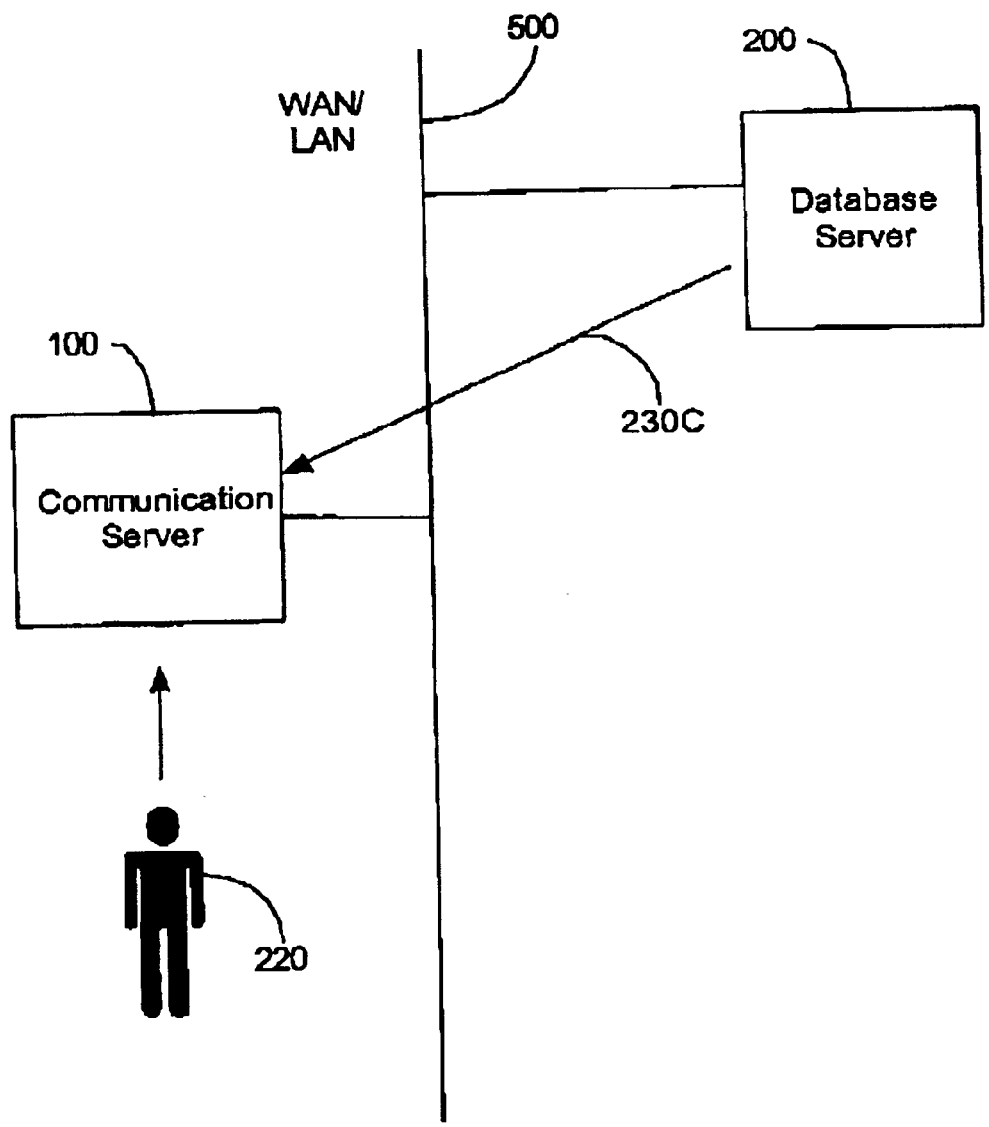
FIG. 10 illustrates the use of the database server to set up the communications server.

A user 220, or system administrator, can make changes to the system by entering these changes in the database. The user can enter the changes by means of a data entry station 210 as illustrated in FIG. 9. The information 230A entered into the data entry station 210 is used to update the database within the database server 200, preferably over the WAN or LAN 500, as illustrated by arrow 230B. Referring also to FIG. 10, when the communication server 100 is next brought up or initiated by a user 220, it receives the data 230C from the database server 200, again over the WAN or LAN 500, and creates the appropriate objects (agents and policies).

Figure 11:
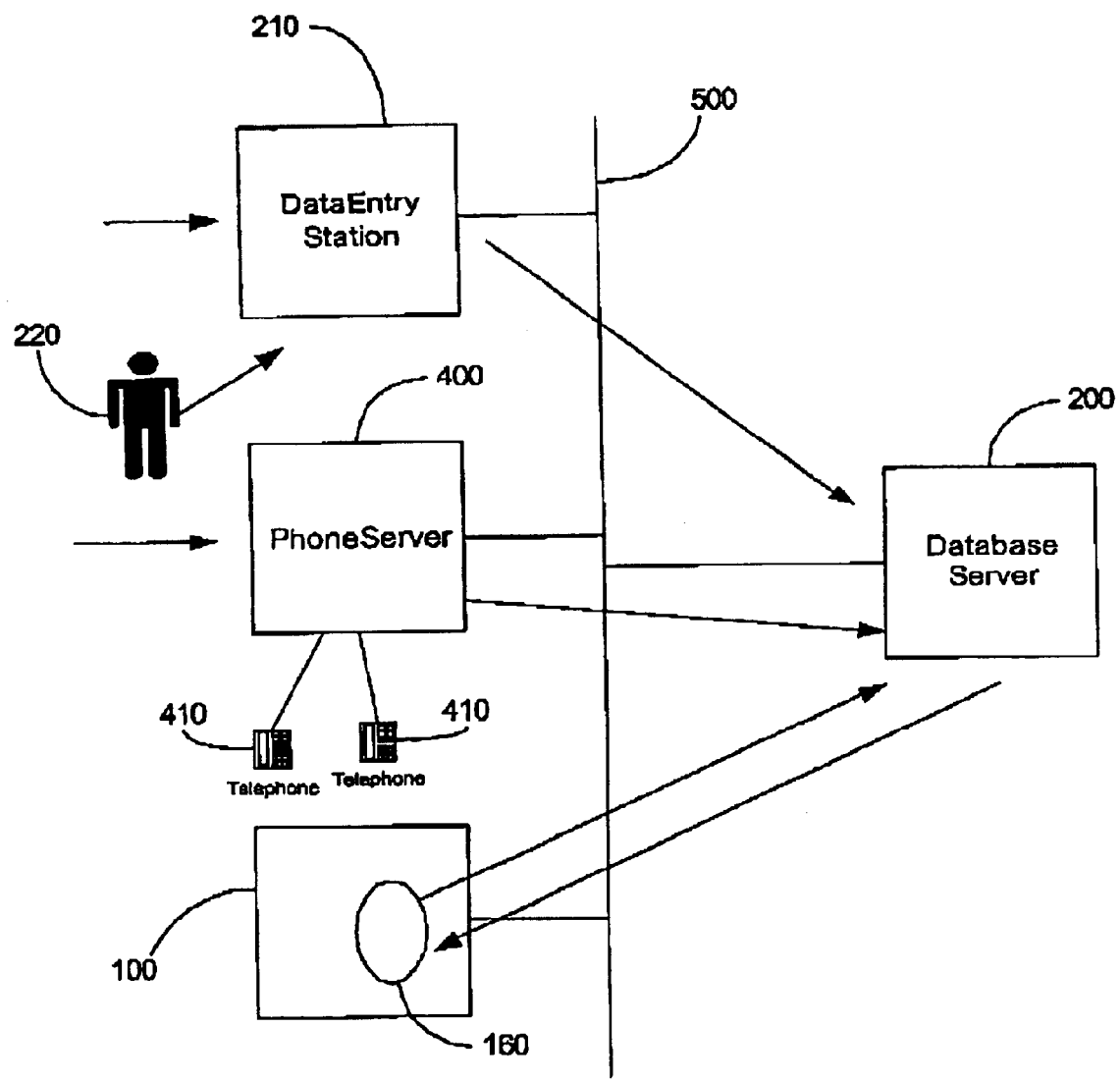
FIG. 11 illustrates how the system is updated.

FIG. 11 illustrates that a user 220 can update the system, over the network 500, using either the data entry station 210 or a device such as a telephone 410 connected to a phone server 400. The changes are entered into the database in database saver 200 and then updated in the communications server 100. Note, however, a buffer 160 can be used to hold changes to avoid disrupting existing communications.

Figure 12:
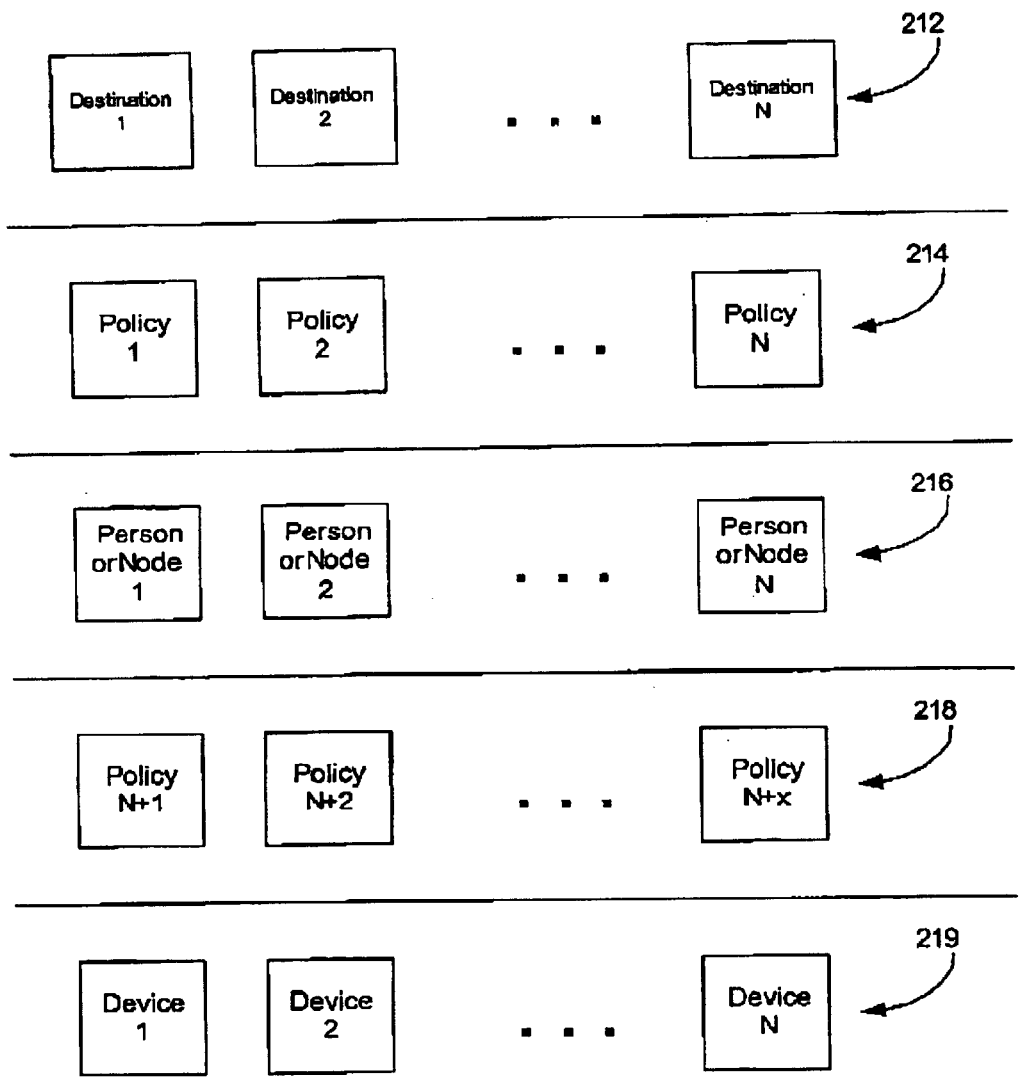
FIG. 12 illustrates an initial layout of objects for a graphical user interface for configuring the system.
Figure 13:
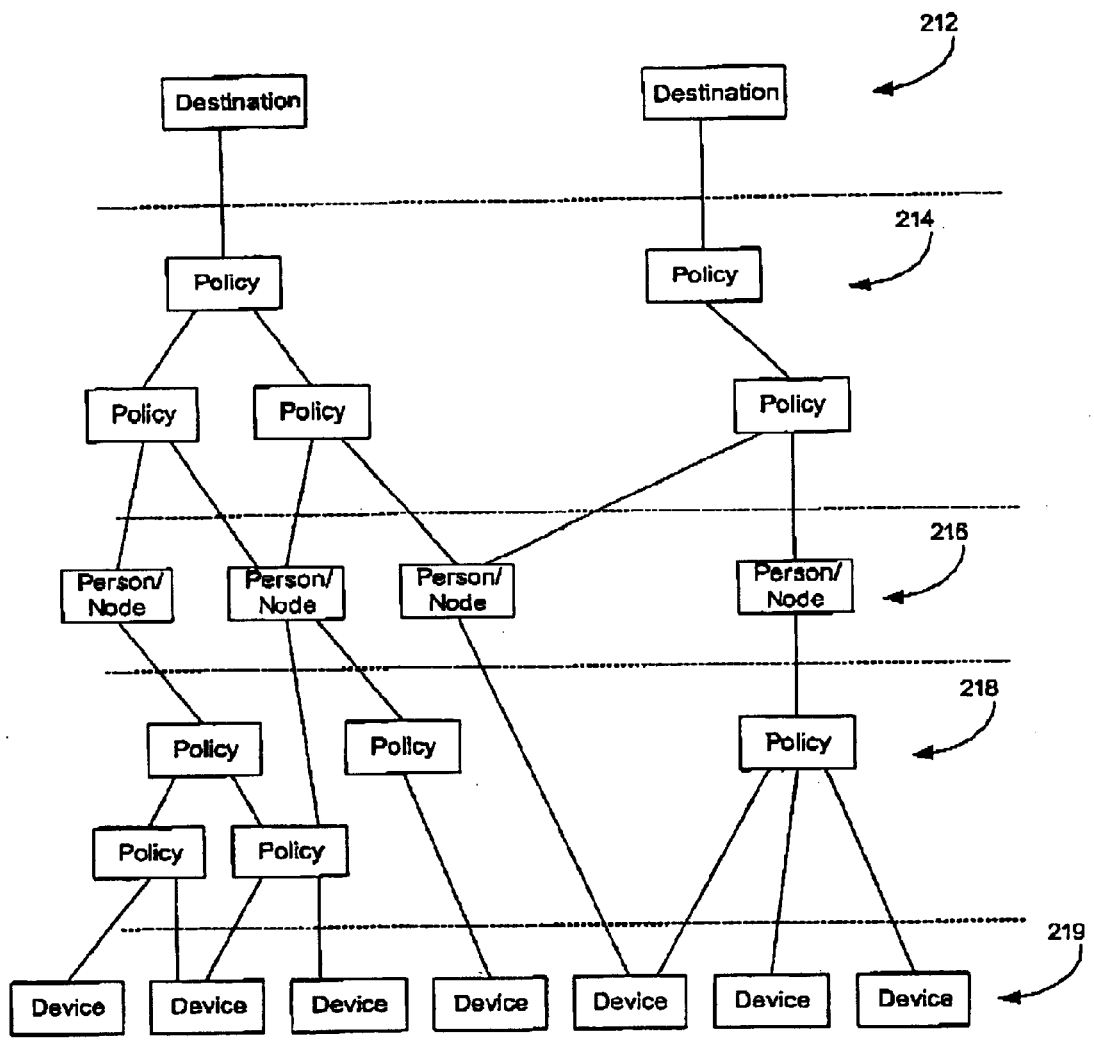
FIG. 13 illustrates the objects of FIG. 12 with relationships defined between agents.

Referring to FIGS. 12 and 13, there are illustrated examples of user interfaces for entering changes to the database at a database entry station. Icons corresponding to destinations, persons or network nodes, devices, and policies are available for manipulation in a default configuration. Specifically, there are icons 212 representing destinations, icons 214 representing policies, icons 216 representing nodes, icons 218 representing additional policies and icons 219 representing devices. Unnecessary icons can be removed or additional icons can be added. These icons are organized in rows, somewhat analogous to the layers of the different agents. In order to establish a desired configuration the user uses the interface to connect these icons defining possible communication paths (by the choice of icons representing agents) and defining properties associated with those communication paths (by the choice of policies).

FIG. 13 illustrates a more complex web of destination, policy, node and device connections through the layers. Note that policies can connect to other policies forming a policy chain. It is also possible to have a direct connection without an intermediary policy if no processing logic is required, for example, if a person always wants to be reached by one particular phone such as a cellular telephone.

Figure 14:
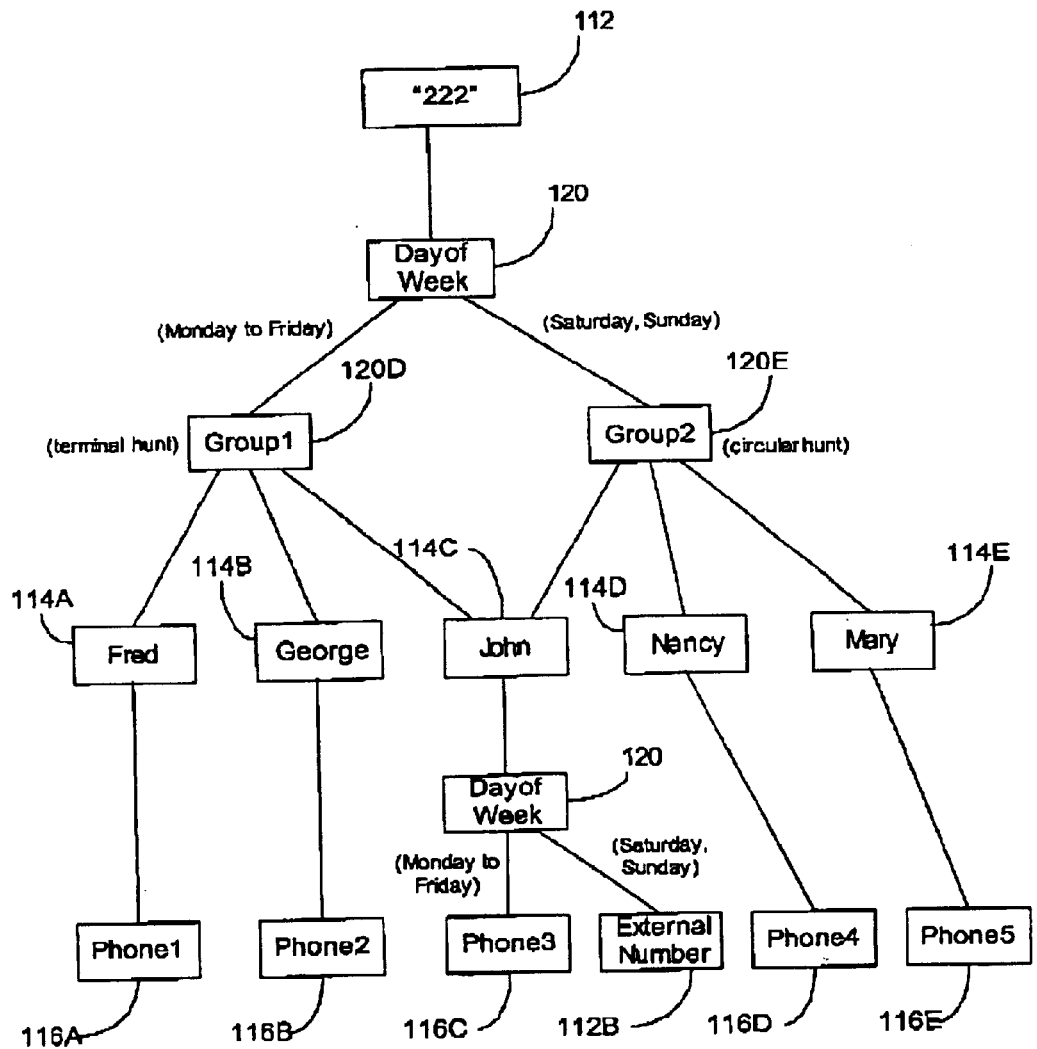
FIG. 14 illustrates an example of a configuration for a particular destination (222)

A more specific example is given in FIG. 14 in which a particular phone number (i.e. destination) "222" needs to be routed differently depending on the day of the week. In the example, the phone number of the help desk is "222". In this example, the number "222", represented by destination agent 112, is the phone number of a help desk which is staffed by two groups. Group 1, represented by policy 120D, is responsible for responding during the week and Group 2, represented by policy 120E, works weekends. John, represented by node agent 114C, works seven days a week and thus belongs to both groups. John works in the office during the week but prefers to work from home during the weekend. FIG. 14 illustrates how such a configuration is easily arranged using the objects of the present invention.

The destination agent 112 receives a call having destination "222". Destination agent 112 then invokes a Day of Week policy 120 which, in turn invokes Group 1 policy 120C on Monday to Friday and Group 2 policy 120D on Saturday and Sunday, based on for example system date and data. Group 1 has a default terminal hunt type starting with Fred, represented by node agent 114A. Accordingly, Fred always gets a help desk call during the week if he is available, otherwise the call passes to George, represented by node agent 114B, and then to John at node 114C. This terminal hunt strategy is used to implement a hierarchy or priority scheme in which Fred, at the head of the list, is responsible for most calls, with George and John acting to handle overflow or backup. No intermediate policy is required for Fred and Phone 1, represented by device agent 116A, or George and Phone 2, represented by device agent 116B, since Fred and George are available if and only if they are by their office telephones. For John, however, a further instance of Day of Week policy 120 is used to determine whether his office phone (Phone 3, represented by device agent 114C) or his home office phone (external number "555-5555" represented by an external number agent 118A) is the appropriate device to reach him, depending on the day of the week.

Calls during the weekend are routed to Group 2 by the first instance of Day of Week policy 120. In this example Group 2 uses a circular hunt type. Thus if the last call was received by Nancy, represented by node agent 114D, and terminating at phone 4 represented by device agent 116D then the system will try Mary, represented by node agent 114E, and terminating at Phone 5, represented by device agent 116D, and finally John at node agent 114C, before passing another call to Nancy at node agent 114D. In contrast to the terminal hunt strategy, this circular hunt strategy is used to equally distribute the work load of responding to calls.

The example of FIG. 14 illustrates an important aspect of the invention. Starting from a first agent, the relationships (defined by policies and structured as a policy chain) associated with that first agent (e.g. destination agent 112) are used to determine a communication path and the second agent (e.g. external number agent 118A) through an intermediate agent (e.g. node agent 114C for John). Note that the policies encountered starting with destination agent 112, determine the communication path and the second agent is not predetermined. Instead the communication path and the second agent are determined, in this example, by data such as the day of the week and the state of the system (e.g. whether Fred and George are available).

Figure 15A:
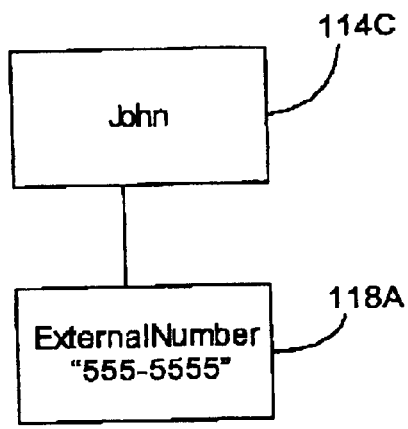
FIGS. 15A to 15C illustrate the association of a person with a device.
Figure 15B:
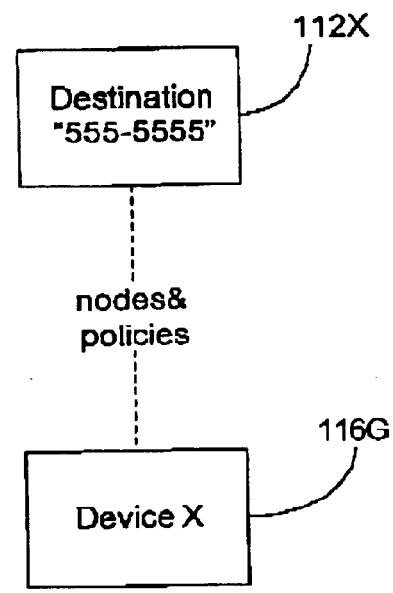
Figure 15C:
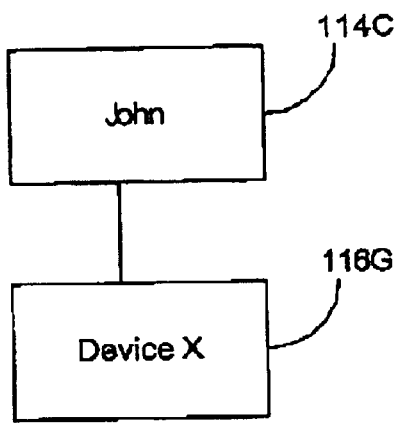

The calls to John at his external number illustrate a further aspect of the invention. John wants his calls to go to his home at external number "555-5555". The system administrator wants to ensure that the best route for calling is used, based on system policies. So instead of having a trunk hooked up to John directly at his home, the system finds an appropriate line. FIGS. 15A to 15C, illustrate how an outbound line is selected. FIG. 15A shows node agent 114C relaying a call to the external number agent 118A associated with John's home, As shown in FIG. 15B, in making this connection the external number agent 118A effectively becomes an instance of a destination agent 112X, which is associated with the external number. The destination agent 112X, representing the external number, determines a device to call using, intermediate policies and nodes. The policies and nodes are used to provide a connection that is consistent with the priorities and preferences of the system. A device, represented by device agent 116G, is then selected and connected to John's agent 114C. For the duration of the call, John's node agent 114C is associated with device agent 116G. As illustrated in FIG. 15C the connection between John's agent 114C and the device agent 116G is logically seamless.

Figure 16:
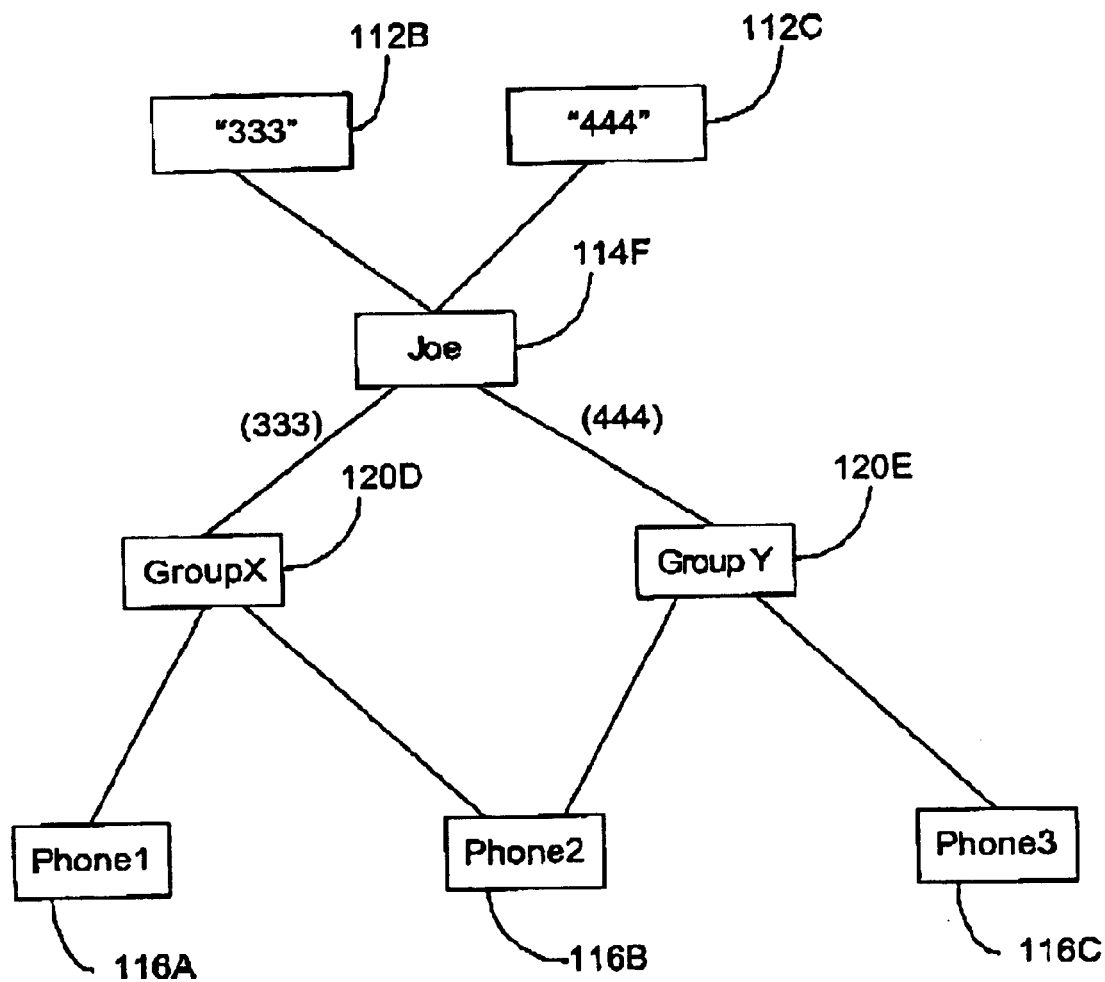
FIG. 16 illustrates an example of a configuration for two destinations directed to a person's node.

A second example of a configuration is provided in FIG. 16 which shows the paths for two destinations "333" and "444" represented by destination agents 112B and 112C, respectively. Both of these destinations point to Joe's node agent 114F Joe's node agent 114F invokes one of two group policies, Group policy X 120D and Group policy Y 120E.

Group policy X 120D has a terminal continuous hunt policy. Group policy Y 120E has a terminal broadcast, policy. Calls whose destination data correspond to "333" are handled according to the policies of Group X 120D. Calls having destination data corresponding to "444" are handled to the policies of Group Y 120E. Group policy X 120D contains rules determining the selection of Phones 1 and 2, respectively represented by device agents 116A and 116B, Group policy Y 120E contains rules determining the selection of Phones 2 and 3, respectively represented by device agents 116B and 116C. Accordingly, if "333" is called, Phone 1 will ring followed by Phone 2 if there is no answer at Phone 1. If "444" is called then both Phones 2 and 3 will ring.

Generally to establish a call, a six agents 110 are involved. FIG. 17 shows that a call is split into two sides or half calls 180. Each half call 180 has at least one device agent 116, one node agent 114 and one destination agent 112. There is also a communication record 170 associated with each half call 180 that tracks all information associated with that half call 180 and is discarded after the half call terminates. This is a typical half call model used in many call control systems.

Figure 18:
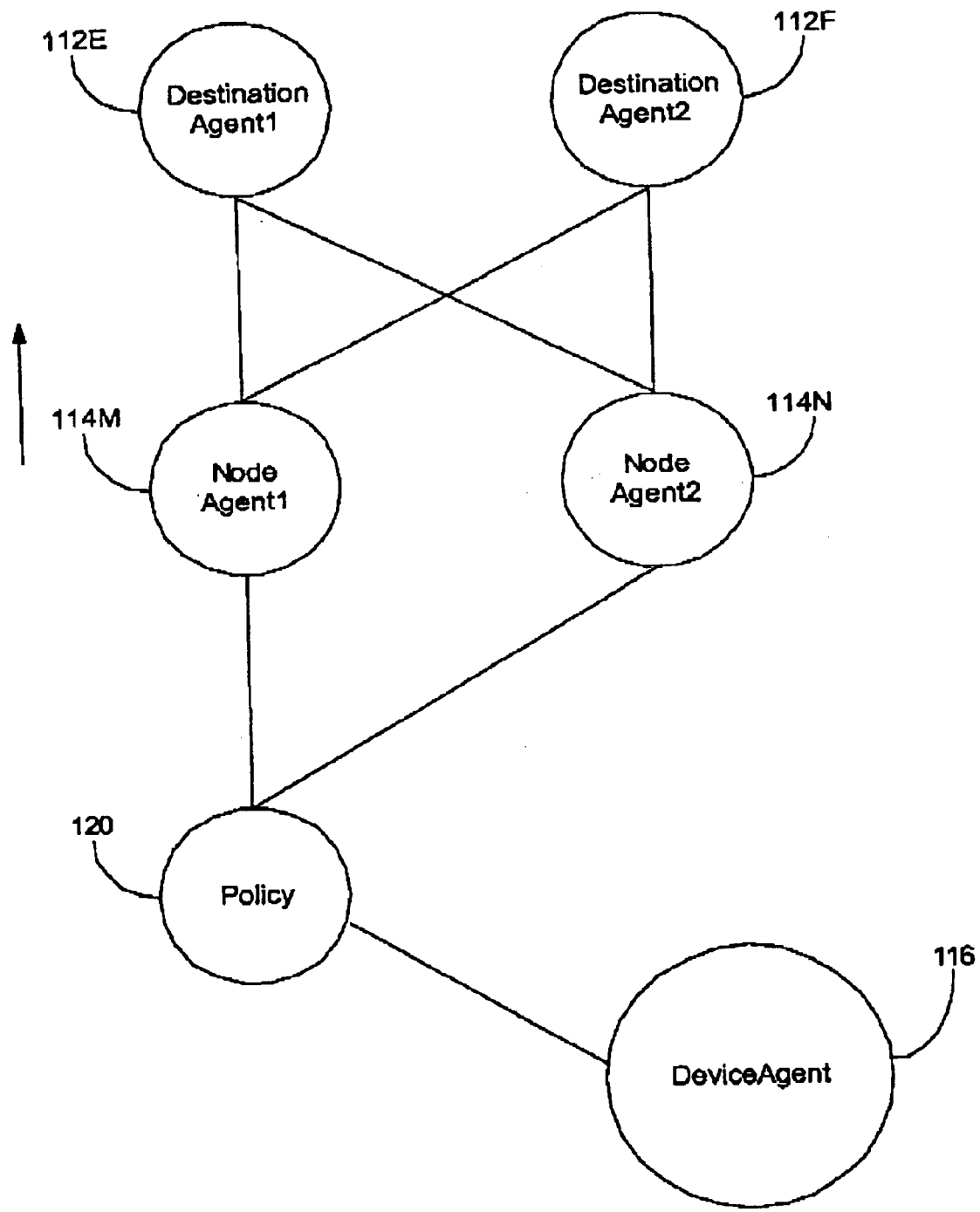
FIG. 18 illustrates an example of line selection for an originating half call.

When a user originates a call using a device, a policy determines which node and destination to use. Specifically, the policy determines which path should be chosen. The example of FIG. 18 shows two destination agents instances 112E and 112F each connected to two node agents instances 114M and 114N which are both connected to one instance of a device agent 116. When this call originates, it has up to four possible paths to follow. An instance of policy 120 is invoked by device agent 116 to determine which path to take. The policy can be set statically, e.g. programmed into the database, or dynamically, e.g. by having the user choose which path is taken at the moment the call is made. In addition, the policy can determine whether static or dynamic routing is chosen.

Figure 19A:
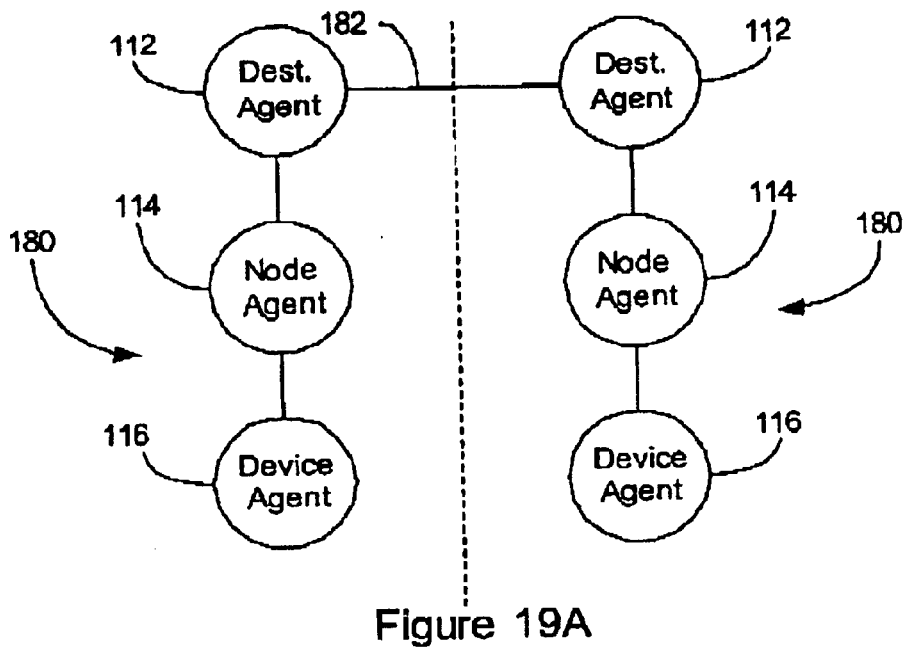
FIGS. 19A to 19C illustrate three types of features of the embodiment of the present invention.
Figure 19B:
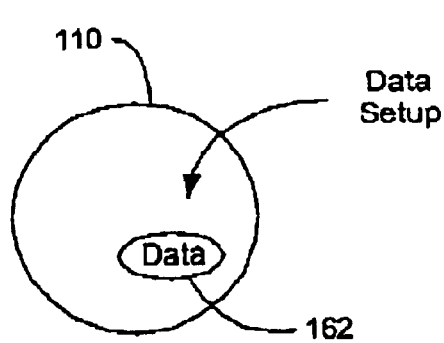
Figure 19C:
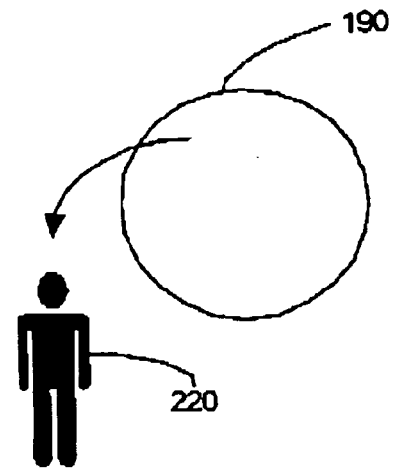

Features are also very important to communication systems. FIGS. 19A to 19C show three types of features. FIG. 19A illustrates a half call, as shown in FIG. 17 where a first half call 180 is initiated by device agent 116 and is processed by node agent 114 and destination agent 112. In the second half call 180 the destination agent 112 and node agent 114 terminate the call at device agent 116. Type 1 features, such as call swap ad conference call, relate to the manipulation or selection of a destination or connection 182 between two half calls 180. As illustrated in FIG. 19B, type 2 features, such as "Do Not Disturb" and "Restriction List", relate to setting up or updating data 162 in or associated with an agent 110. Type 3 features include advanced programmable system (APS) features such as Dual Tone Multiple Frequency (DTMF) tones including intelligent tonner or the use of interactive voice response (IVR) technology to replace a tone with another tone or a message. Type 3 features give feedback to a user 220 who can then make selections. Features 190 can also be elements of the system that are implemented as objects that can modify the communication path, its properties and the agent at which the communication path terminates. As illustrated in FIG. 19B, features can provede data 162 for use by agents 110.

Further examples of type 1, 2 and 3 features are listed in FIGS. 20A, 20B and 20C respectively The examples of FIG. 20 are not exhaustive and additional features are possible. The focus of the present examples is on the use of agents and polices by a system to increase functionality and flexibility. Greater sophistication can, of course, be introduced by adding more intelligence and functionality to the agents or policies. For example, APS features can be used to get more information from callers using features in order to give allow agents to do more. More specifically, a caller to a service provider may be asked to provide an identifier such as an account number through IVR. Depending on the account number, the call may be routed to different attendants or services. For example, if the service provider is an insurance company, then the account number will identify the name of the customer and that will be used to direct the call to the person responsible for that person's account. As another example, the service provider may be a credit card company offering different levels of service (silver, gold, platinum, etc.) to different card holders. The caller's account number can then be used to route the caller to an appropriate queue or otherwise provide an appropriate level of service.

Figure 21:
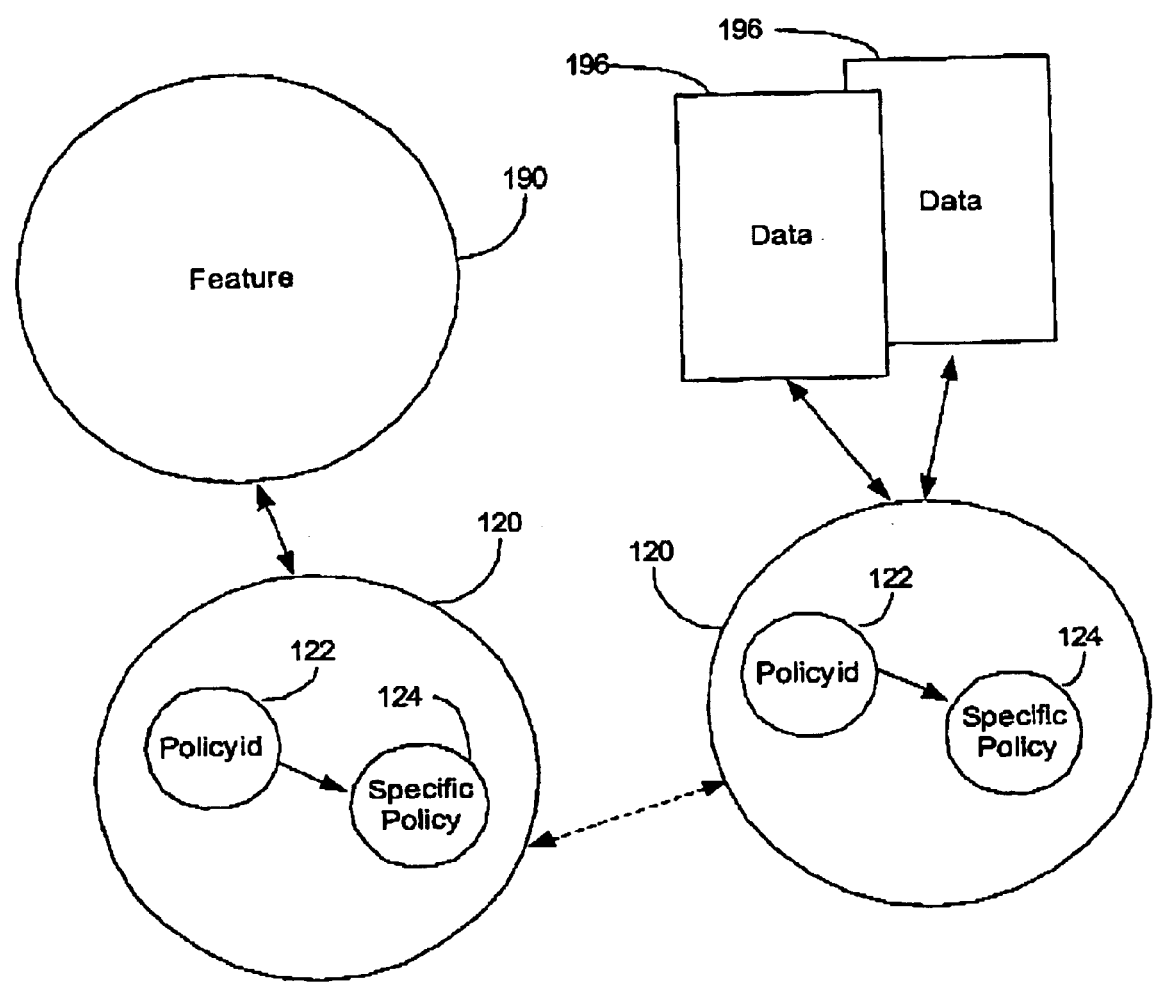
FIG. 21 illustrates the use of policies by a feature.

Features can also invoke policies. The data that a feature provides can be chosen based on policy. This is illustrated in FIG. 21. A feature 190 retrieves the data 196 it needs, This can be done through one or more policies 120. The policies determine which data 196 is retrieved. An example of such a feature is Time of Day Call Forwarding. Time of Day call Forwarding uses a specific Time of Day policy 124 to determine the call destination. The feature 190 determines the specific policy 124 by addressing a particular policy identifier 122. A time of Day policy instance 124 may, for example, forward calls to a help desk during office hours and forward calls to voicemail system outside of office hours.

Figure 22:
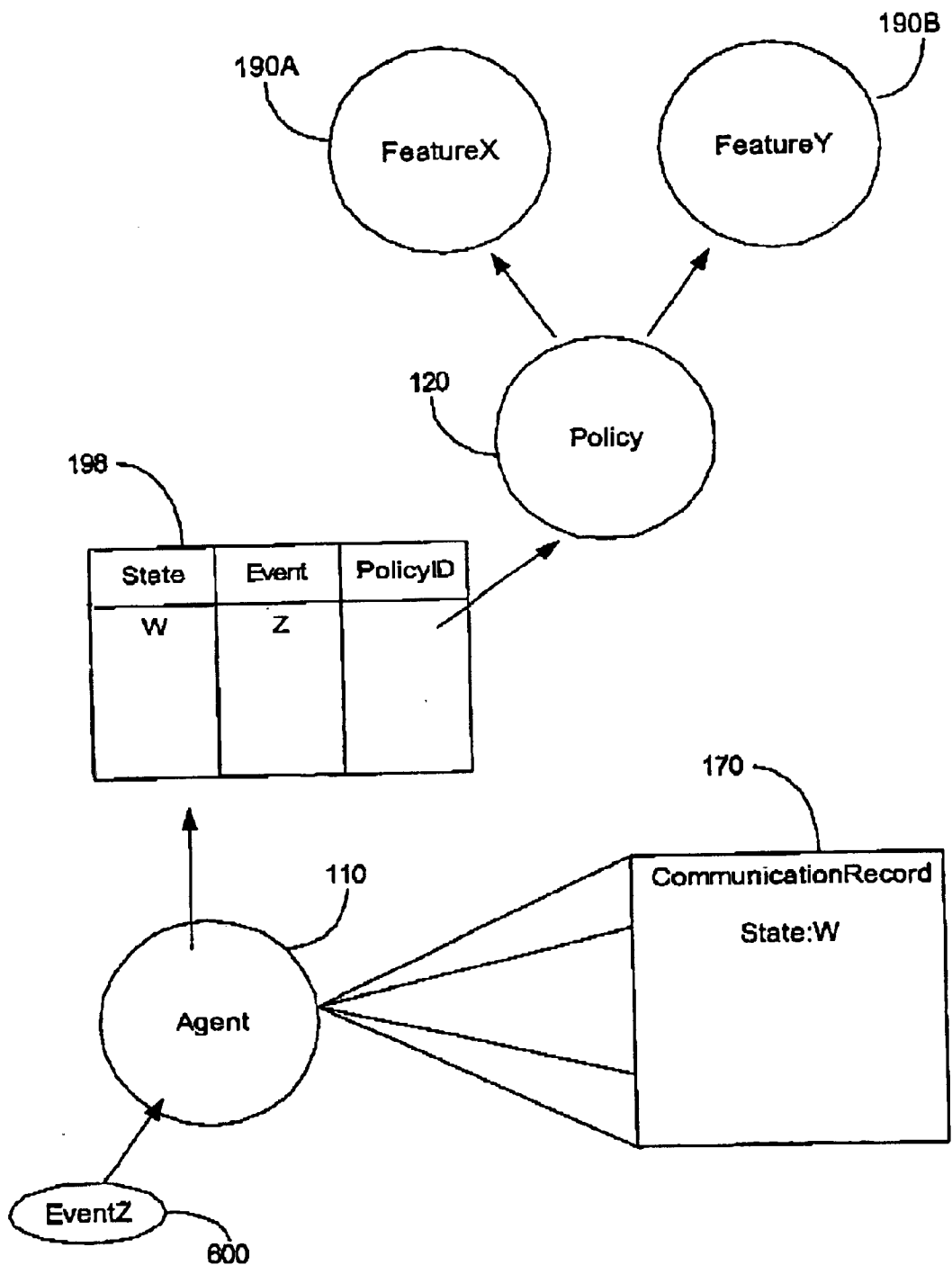
FIG. 22 illustrates the use of a trigger table to determine which feature is selected.

Features 190 are triggered or invoked in a particular agent 110 through an event occurring in a particular state. FIG. 22 shows how an instance of a policy can be used to flexibly determine which feature is triggered. When an event Z 600 is detected by an agent 110, there is an associated communication record 170 which contains the call state. The agent 110 then consults its trigger table 198. The trigger table 198 contains a list of states and events, and corresponding policy IDs. Each policy IDs points to a policy 120 that invokes a particular feature, such as features 190A and 190B. In this way, features 190A and 190B can have the same state and event trigger, but through a policy, one can have priority over the other. The priority of one feature over another can also be based on other policies like Time of Day or Calling ID, etc.

Figure 23:
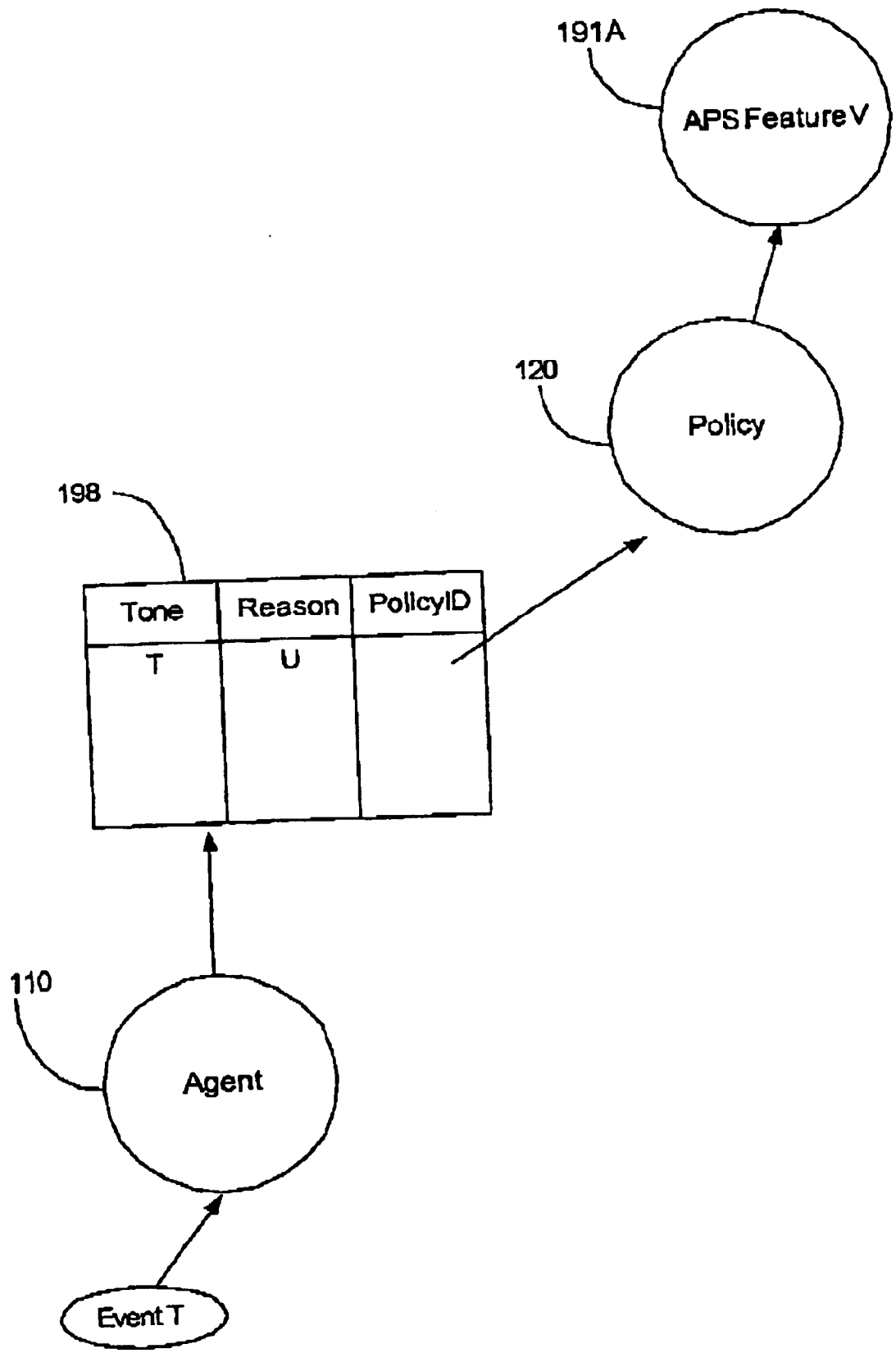
FIG. 23 illustrates the use of a policy to determine which APS feature is triggered.

APS features are triggered in a similar way. FIG. 23 shows how a policy can be used to flexibly determine which APS feature is triggered. When a specific type of event, e.g. tone T, occurs, agent 110, through in-line code consults trigger table 198. This trigger table 198 contains a list of associated parameters, specifically, tones and reasons and corresponding policy IDs. Each policy ID point to a policy 120 which invokes appropriate APS features, such as APS Feature V 191A. For example when giving a dial tone to start a call, an APS feature may be triggered to select a line. Trigger tables also reside in the database and can be uniquely assigned to an agent.

New policies can be added very simply in this system. The architecture provides the building blocks to create routing, handling and features needed by customers in a communication system.

What is claimed is:

1. A method for establishing a communication path in a data-driven communication system, comprising:

defining a first layer agent, a first set of predetermined policies for linking the first layer agent to a second layer agent, and a second set of predetermined policies for linking the second layer agent to a third layer agent;

receiving, at the first layer agent, data related to a communication;

invoking a first policy of the first set of predetermined policies in accordance with the data related to the communication;

establishing a first policy chain through the first set of predetermined policies linking the first layer agent and the second layer agent;

invoking a policy of the second set of predetermined policies in accordance with data received from the second layer agent;

establishing a second policy chain through the second set of predetermined policies linking the second layer agent and the third layer agent, the first and second policy chains determining a communication path between the first layer agent and the third layer agent;

modifying the communication path in response to at least one system feature associated with a trigger table pointing to a policy chain.

2. The method of claim 1, wherein the first layer agent is a destination agent, the second layer agent is a node agent, and the third layer agent is a device agent.

3. The method of claim 1, wherein receiving the data related to the communication path includes receiving system parameters.

4. The method of claim 1, wherein receiving the data related to the communication includes receiving a system time.

5. The method of claim 1, wherein receiving the data related to the communication includes receiving a system date.

6. The method of claim 5, wherein receiving the data related to the communication includes receiving a day of week.

7. A data-driven communication system for establishing a data-driven communication path, comprising:

a first layer agent operable to receive data related to a communication;

a second layer agent linked to the first layer agent by a first set of predetermined policies such that a first policy chain can be established therebetween, in accordance with the data related to the communication, thereby linking the first layer agent to the second layer agent;

a third layer agent linked to the second layer agent by a second set of predetermined policies such that a second policy chain can be established therebetween, in accordance with data received from the second layer agent, thereby linking the second layer agent to the third layer agent and establishing a data-driven communication path between the first layer agent and the third layer agent; and at least one system feature for modifying the communication path, the at least one system feature triggered in accordance with a trigger table which points to a policy chain.

8. The communication system of claim 7, wherein the first layer agent is a device agent, the second layer agent is a node agent, and the third layer agent is a destination agent.

9. The communication system of claim 7, wherein the communication path is a communication path of a half call.

10. The communication system of claim 7, wherein the at least one system feature is an in-call feature.

11. The communication system of claim 7, wherein the at least one system feature is a data modifying feature.

12. The communication system of claim 7, wherein the at least one system feature is an advanced programmable system feature.

13. The communication system of claim 12, wherein the at least one advanced programmable system feature is triggered by a tone given for a reason.

14. The communication system of claim of claim 12, wherein the policy chain determines the advanced programmable system feature to be triggered.

15. The communication system of claim 7, wherein the first, second and third layer agents are implemented as instances of objects.

16. The communication system of claim 7, further comprising a database having entries corresponding to instances of the first, second and third layer agents.

17. The communication system of claim 16, wherein the database comprises tables corresponding respectively to instances of the first, second and third layer agents.

18. The communication system of claim, 17, wherein the database further comprises a table corresponding to the first and second sets of predetermined policies.

19. The communication system of claim 18, including means for configuring the system through the database upon startup.

20. The communication system of claim 18, including means for reconfiguring the system through the database.

21. The communication system of claim 16, further including a user interface for entering changes to the database.

22. The communication system of claim 21, wherein the user interface is a graphical user interface for displaying modifiable icons, representing agents and policies, and modifiable interconnections between them, for facilitating modification of the database.

23. The communication system of claim 16, wherein the database includes trigger tables.

24. The communication system of claim 16, wherein the database includes advanced programmable system feature definitions.

25. The communication system of claim 7, wherein the trigger table is associated to an agent.

26. The communication system of claim 7, wherein the at least one system feature is triggered by an event in a state.

27. The communication system of claim 7, wherein the policy chain determines the at least one system feature to be triggered.

* * * * *